US006924733B1

(12) United States Patent
McTier et al.

(10) Patent No.: US 6,924,733 B1
(45) Date of Patent: Aug. 2, 2005

(54) HOSE SEPARATION TRANSMITTER SYSTEM AND METHODS

(75) Inventors: Samuel E. McTier, Lake Forest, IL (US); Jack Glandon, Fresno, CA (US); William B. McDonough, Huntington Beach, CA (US)

(73) Assignee: McTier Supply Company, Lake Forest, IL (US)

( * ) Notice: Subject to any disclaimer, the term of this patent is extended or adjusted under 35 U.S.C. 154(b) by 131 days.

(21) Appl. No.: 10/645,808

(22) Filed: Aug. 21, 2003

(51) Int. Cl.[7] .................................... B60Q 1/00
(52) U.S. Cl. ............................ 340/425.5; 340/825.69; 417/9; 417/10; 417/63; 251/89; 137/68.18; 137/804; 137/805
(58) Field of Search ............................ 340/425.5, 438, 340/825.69; 417/9, 10, 63; 251/89; 137/456, 137/68.18, 804, 805, 553

(56) References Cited

U.S. PATENT DOCUMENTS 5,263,824 A * 11/1993 Waldbeser et al. ............ 417/10
5,999,087 A * 12/1999 Gunton .................... 340/309.5
6,412,512 B1 * 7/2002 Vernet ..................... 137/68.13
6,827,112 B2 * 12/2004 Lemmon ..................... 141/98

OTHER PUBLICATIONS

PT2262 Encoder specification, Princeton Technology, May 1998, 18 pgs.
Advertisement, "Passive Transport Shut Down, Automatic Leak Detection," LPGAS Magazine, Feb. 2003, p. 9.

* cited by examiner

*Primary Examiner*—Daniel Wu
*Assistant Examiner*—Samuel J. Walk
(74) *Attorney, Agent, or Firm*—Cook, Alex, McFarron, Manzo, Cummings & Mehler, Ltd.

(57) ABSTRACT

A hose separation transmitter system includes a shock sensor and a transmitter that are secured to the delivery hose. If the hose becomes disconnected, the shock sensor will generate a shock signal when the hose falls to the ground and the transmitter will respond to the shock signal by generating an encoded RF signal. A receiver at the vehicle receives the RF signal from the transmitter, determines that a hose disconnect has occurred, and automatically disables a fluid pump or closes a valve to stop the flow of fluid. The shock sensor preferably uses a strip of piezoelectric material. Related methods are also disclosed. For quick connect and disconnect, the shock sensor and transmitter are preferably secured to the hose by a hook and loop fabric material. The transmitter is immune to normal ambient vibration levels. Related methods are also disclosed.

20 Claims, 4 Drawing Sheets

HOSE SEPARATION TRANSMITTER SYSTEM AND METHODS

FIELD OF THE INVENTION

The present invention relates generally to safety devices for handling hazardous materials. More particularly, the invention relates to apparatus and methods for sensing the separation of a hose that is supplying hazardous material.

BACKGROUND OF THE INVENTION

Hoses are often used to deliver hazardous materials, such as gasoline or propane, from a delivery vehicle to a storage tank. Portable hoses are typically used to deliver liquid material from the delivery vehicle to a storage tank, which may be located underground. For each delivery, the portable hose is connected to a connector on the vehicle and routed to the filler receptacle for the storage tank. A fluid pump on the vehicle is then started to pump a measured quantity of liquid material from the delivery vehicle into the storage tank.

Despite best safety practices and procedures, from time to time, such a hose occasionally separates or comes loose from the connector on the delivery vehicle. This may be due to improper connection or mating of the respective connectors on the end of the hose and on the delivery vehicle, due to a faulty connector, or due to other separation of the hose or the like. This can result in loss or spillage of the liquid material. However, more importantly, such disconnection or separation of the hose from the delivery vehicle can pose serious safety concerns if the liquid material is flammable or explosive, such as may occur with gasoline or propane, for example. Such spillages also create environmental problems.

For example, typical delivery rates for gasoline or propane may be about 300 gallons per minute. Even a quick manual response to a disconnection or separation of the delivery hose can easily result in the spillage of 100 gallons or more. Of course, such spillages may spread under the delivery vehicle and imperil the delivery vehicle in addition to any personnel in the area. There is therefore a need for quickly sensing and automatically terminating the delivery of flammable fuels upon any disconnection or separation of the hose from the vehicle.

Some delivery vehicles are equipped with a safety shutoff to stop the flow of fluid when unsafe conditions develop. However, in some instances, it may be unsafe to be in the vicinity of the safety shutoff, and it is also possible that the driver may be incapacitated.

There has been a long-felt need for an effective means of sensing the disconnection or separation of a hose from a delivery vehicle, and for automatically terminating the flow of the liquid material upon sensing the disconnection or separation.

Accordingly, it is a general object of the present invention to provide apparatus for sensing the disconnection or separation of a hose from a delivery vehicle.

Another object of the present invention is to provide signals upon sensing the disconnection or separation of the hose that may be used to automatically terminate the flow of the liquid material from the vehicle, without human intervention, such as by shutting off the engine that operates the fluid pump.

Yet another object of the present invention is to sense the disconnection or separation of the hose from the delivery vehicle with a shock sensor as the hose hits the any object, the ground or the pavement.

A further object of the present invention is that the shock sensing apparatus not be affected by, or be responsive to, normal vibration at the hose during the usual pumping operations.

A still further object of the present invention is to provide radio frequency signals from the shock sensor that may be used by a receiver at the delivery vehicle to shut off the engine, to stop the pump and to automatically terminate the flow of the liquid materials upon disconnection or separation of the hose from the delivery vehicle.

Yet another object of the present invention is to provide means for easy and rapid attachment of the shock sensor to the hose, and for rapid detachment therefrom.

BRIEF SUMMARY OF THE INVENTION

This invention is directed to apparatus and methods for determining whether a delivery hose has disconnected or separated from a liquid delivery vehicle and for automatically terminating the flow of liquid in response to determining that a disconnection or separation has occurred. The system includes a shock sensor that provides a shock signal when the hose falls to the ground or otherwise makes contact with any object, a transmitter that is responsive to the shock signal to transmit a disconnect or separation signal, means for securing the shock sensor and the transmitter to the delivery hose, a receiver for receiving the disconnect or separation signal from the transmitter and for determining that a disconnect or separation signal has been received, and means for automatically shutting off the engine and terminating the flow of fluid from the delivery vehicle in response to the receiver determining that a disconnect or separation signal was transmitted by the transmitter.

The shock sensor is preferably a strip of piezoelectric material that provides an electrical signal when subjected to shock conditions. The transmitter includes electronic circuitry that has excellent immunity to normal ambient vibration, such as that associated with a fluid pump and with the engine of the vehicle, which is often employed to power the pump. Preferably, the transmitter also encodes a radio frequency transmitted signal such that only an associated receiver can decode the transmitted signals. The shock sensor and transmitter are preferably secured to the hose by means of a quick connect and quick disconnect, such as by a hook and loop material.

The receiver at the vehicle is in communication with the pump to automatically deactivate the pump, or the vehicle engine if the pump is driven by the vehicle engine. The receiver may also be in communication with an automatic valve to close the valve upon determining that a disconnect or separation signal has been transmitted.

The present invention is also directed at a transmitter for such a system including a shock sensor for providing a shock signal when a disconnected or separated hose falls to the ground or otherwise comes into contact with any object, electronic circuitry responsive to the shock signal to transmit a disconnect signal and means for securing the shock sensor and transmitter to the delivery hose.

The present invention further includes methods for determining that a delivery hose has disconnected or separated from a delivery vehicle. The steps of the method include securing the shock sensor and transmitter to the delivery hose, generating a shock signal when the delivery hose falls to the ground or comes into contact with any object, and transmitting a disconnect signal from the transmitter to the receiver when the shock sensor generates the shock signal. Further steps include receiving the disconnect signal at the receiver, determining at the receiver that a disconnect signal has been transmitted by the transmitter, and automatically terminating the flow of fluid from the delivery vehicle in response to the receiver determining that a disconnect signal was transmitted by the transmitter. Terminating the flow of fluid may be by automatically disabling the pump and by automatically closing a valve.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the figures in which like reference numerals identify like elements, and in which:

DESCRIPTION OF THE PREFERRED EMBODIMENT

Figure 1:
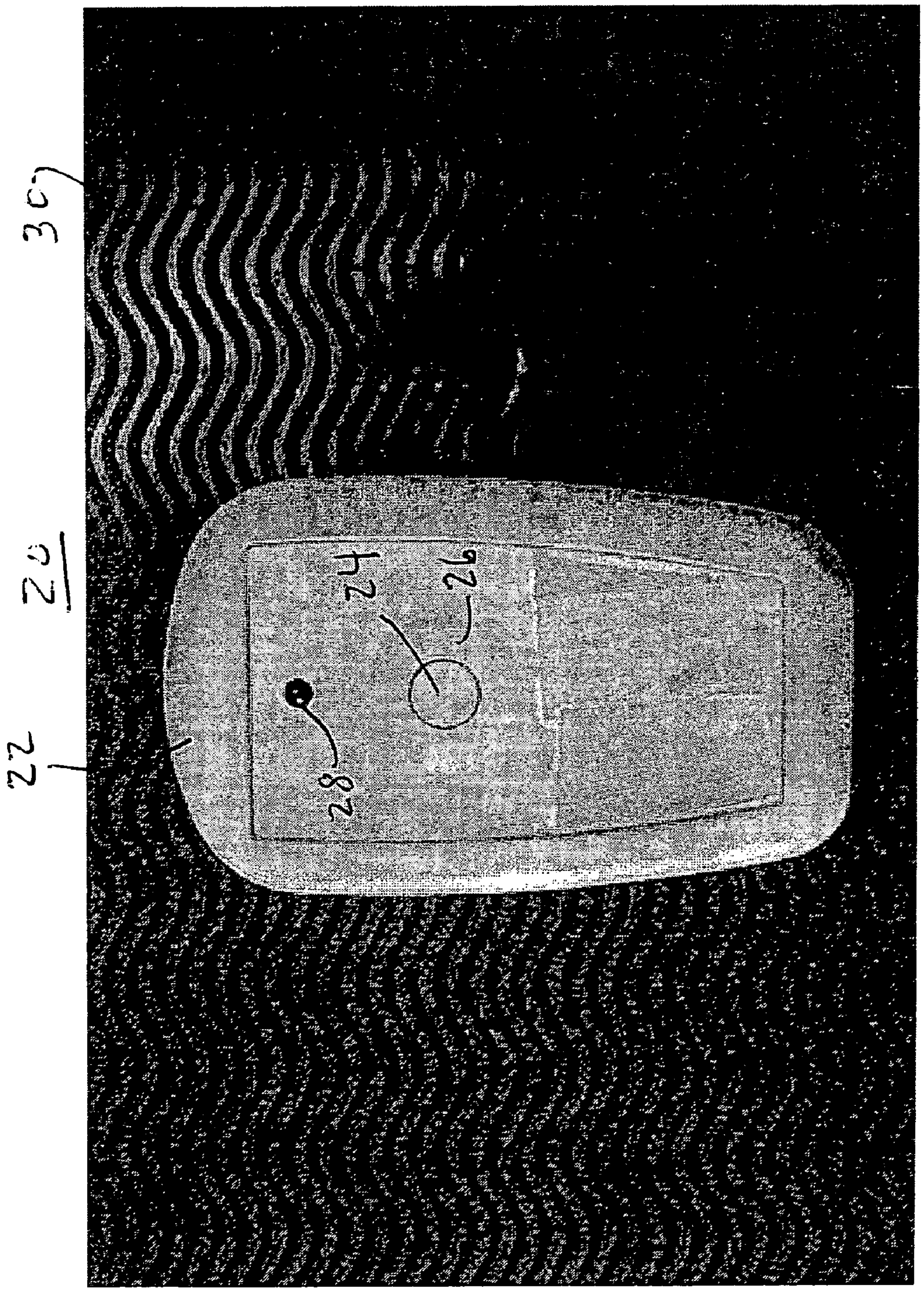
FIG. 1 is a top plan view of the hose separation transmitter of the present invention that senses disconnection or separation of a hose and that transmits a signal upon sensing the disconnection or separation of the hose.

A hose separation transmitter, generally designated 20, in accordance with the present invention is shown in FIG. 1. Hose separation transmitter 20 includes a housing 22 for enclosing the operative electronics which will be presented below with reference to FIG. 3. Housing 22 may be, for example, formed from any suitable plastic material by known plastic injection molding techniques.

A pushbutton 24 is disposed on the housing 22 to activate or to deactivate the transmitter within the housing. Pushbutton 24 is preferably flush with the housing 22. An illumination device 28, such as a light emitting diode (LED), may be provided on the transmitter and may remain illuminated when transmitter 20 is activated to indicate that it is operational and that the battery has adequate charge. Of course, LED 28 could also be used, if desired, to signal any of a variety of conditions. For example, LED 28 may occasionally blink to indicate that the transmitter 20 is operational and that the internal battery has adequate charge. LED 28 may flash at a different rate upon sensing a disconnection between the hose and the connector on the vehicle. If the battery is low and needs recharging or replacement, LED 28 may flash at yet a different rate.

Hose transmitter 20 has means for attaching the transmitter about the hose that is being sensed. In this example, transmitter 20 is attached to a band 30 of self-adhesive material, such as the hook and loop fabric material marketed under the Velcro trademark by Velcro Industries. Band 30 is of sufficient length to surround the circumference of the hose and has sufficient additional length that the opposite ends of band 30 can attach to each other to keep transmitter 20 secured to the hose.

Figure 2:
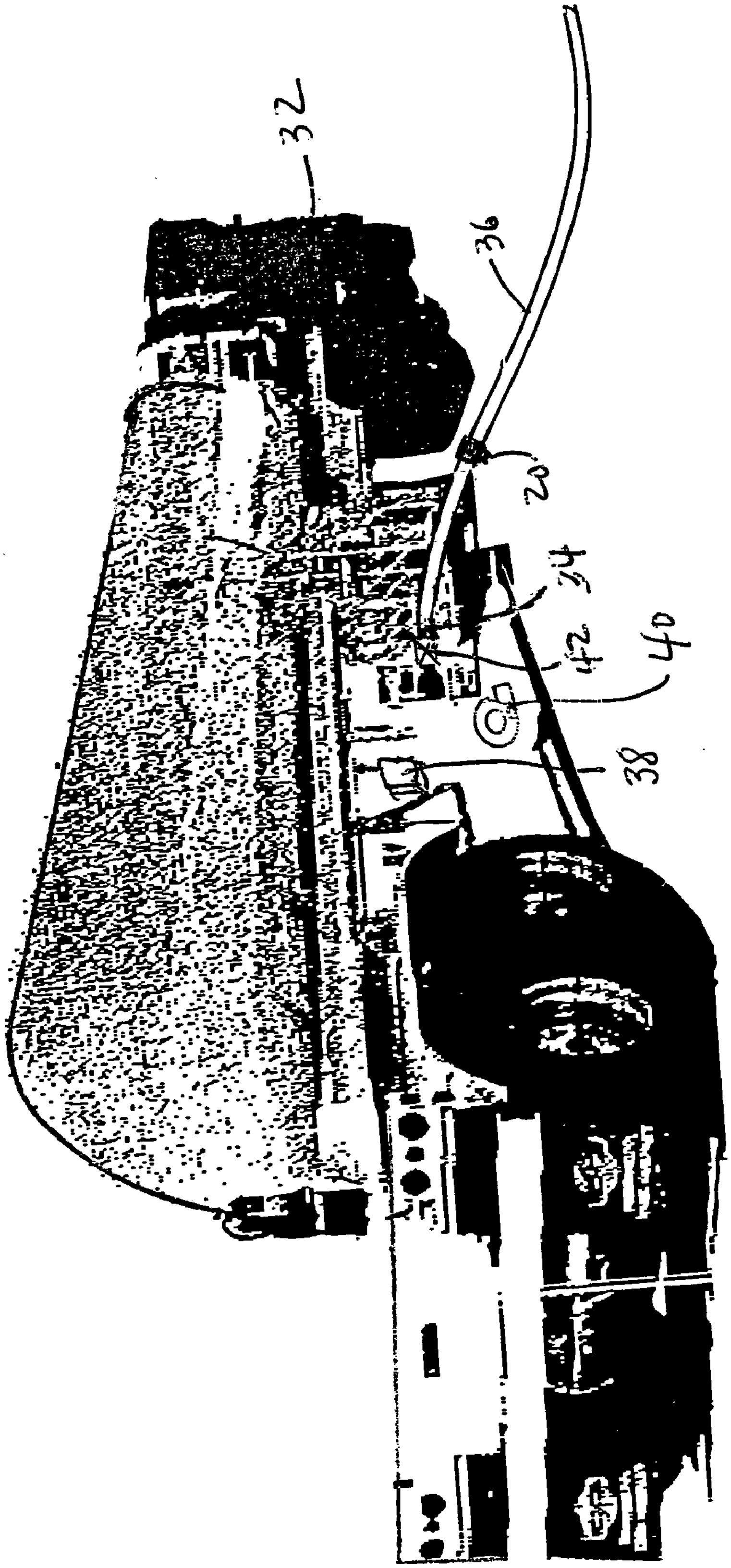
FIG. 2 is a perspective view of a liquid material delivery vehicle, with a hose connected to a connector on the vehicle for supplying liquid from the vehicle, and the hose separation transmitter of FIG. 1 attached to the hose to sense any disconnection or separation thereof.

As shown in FIG. 2, a delivery vehicle 32 has a connector 34 to which a delivery hose 36 may be attached when delivering liquid material from the vehicle to a storage tank or the like. Transmitter 20 is secured about the hose 36 at an elevated location above the ground. If the hose should become disconnected from connector 34, when the elevated portion of the hose 36 falls and strikes the ground or pavement or otherwise comes into contact with any object, an internal piezoelectric sensor in the transmitter 20 will generate an electrical signal in response to the shock caused by the impact with the ground or object. Transmitter 20 will then transmit a radio frequency (RF) signal to a receiver 38 which will disable a pump 40 that is pumping the liquid material from the delivery vehicle 32 through hose 36 to stop the flow of liquid material from the delivery vehicle. While pump 40 is shown diagrammatically in FIG. 2, it will be appreciated that pump 40 may be disposed underneath the vehicle 32 in a location that cannot be readily seen from the perspective view of FIG. 2, and that pump 40 is in fluid communication with valve 42 and connector 32. Alternatively, delivery vehicle 32 may be equipped with an electrically actuated valve 42 which may be actuated by receiver 38 to a closed position to terminate the flow of liquid material from delivery vehicle 32 in addition to deactivating pump 40. It may be desirable to also deactivate pump 40 to avoid damage to it upon closure of valve 42.

Figure 3:
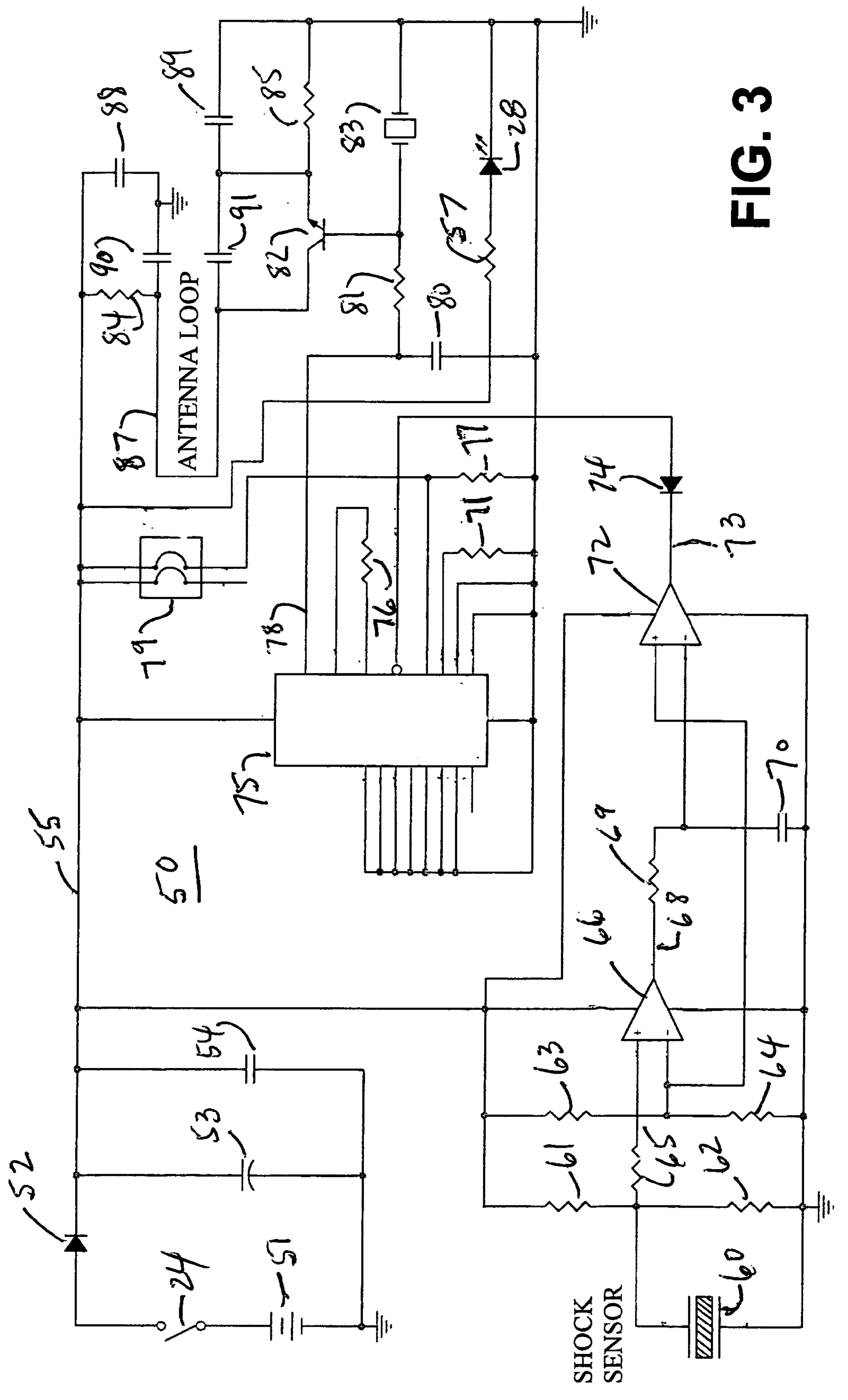
FIG. 3 is a schematic circuit diagram of the electronic circuitry for the hose separation transmitter of FIG. 1.

The electronic circuitry, generally designated 50, is illustrated in schematic form in FIG. 3. A battery 51 supplies operating power for the electronic circuitry 50. For example, battery 51 may be a replaceable 9 volt battery. The previously described pushbutton 24 operates as an ON/OFF switch for the circuitry. A diode 52 protects the circuitry from any inadvertent reverse polarity connection of battery 51. Capacitors 53 and 54 provide filtering of the battery voltage supplied to the circuitry via line 55. For example, capacitor 53 may be an electrolytic capacitor of larger capacitive value that stores electrical energy and that continues to supply power to the circuitry for a short amount of time after pushbutton 22 disconnects battery 51 from the circuitry. Capacitor 54 preferably provides high frequency decoupling for line 55. The previously mentioned LED 28 is connected to line 55 via a current limiting resistor 57. Thus, LED 28 remains continuously illuminated when pushbutton 24 permits battery power to be supplied to circuitry 50.

In accordance with one aspect of the present invention, a shock sensor 60 senses when the hose becomes disconnected or separated and falls to the ground or pavement. The shock sensor 60 and transmitter 20 may be physically separate components that are attached to the hose 36, or they may effectively be a single component that is housed within housing 22.

Shock sensor 60 is preferably a flexible piezoelectric strip that has the property of being able to convert mechanical motion into electrical energy. Thus, when shock sensor 60 is jarred, it produces an electrical signal in response to the motion or shock. This electrical signal is produced irrespective of the orientation of the shock sensor in the commonly used x, y or z axes. The amplitude of the electrical signal is dependent upon the magnitude of the motion or shock, with a larger shock producing a signal of greater amplitude. The signal produced by shock sensor 60 is also an alternating voltage signal as the sensor moves back and forth in response to any shock.

Any signals generated by shock sensor 60 are monitored by a comparator 66. Resistors 63 and 64 establish a high impedance bias level of about one-half of the supply voltage at the inverting input of comparator 66. Resistors 61 and 62 set the bias at the non-inverting input of the comparator 66 and resistor 65 provides the signal from shock sensor 60 to the non-inverting input of comparator 66. It will be appreciated that the bias level provided by resistors 61 and 62 must be sufficiently below the bias level provided by resistors 63 and 64 such that shock sensor 60 does not falsely trigger the electronic circuitry 50 into determining that a hose separation has occurred while experiencing normal levels of ambient vibration. In this respect, the pump when running can be expected to create a certain ambient level of vibration. Furthermore, such pumps frequently are powered by the engine of the truck, which adds additional ambient vibration. Thus, there needs to be an adequate dead zone between the biasing levels to avoid false detection of a hose separation due to ambient vibration levels inherent in normal pumping situations.

Normally, the output terminal 68 of comparator 66 is at a low level. When shock sensor 66 receives a sufficiently large shock to generate a signal that exceeds the threshold voltage at the inverting terminal of comparator 66, the output terminal 68 of comparator 66 goes to a high level, which will be near the battery voltage. It will be appreciated that the selection of resistors 61 and 62 must.

Resistor 69 and capacitor 70 form a low pass filter that provides the output signal of comparator 66 to another comparator 72 to its inverting input. The non-inverting input of comparator 72 is referenced to the same bias level provided by resistors 63 and 64. Thus, the output terminal 73 of comparator 72 is normally at a high level. However, when the output terminal 68 of comparator 66 goes high in response to a sufficiently large signal from shock sensor 60, the output terminal 73 of comparator 72 goes to a low level. The output of comparator 72 will then sink current through diode 74 from an enable terminal of an encoder integrated circuit (IC) 75.

IC 75 is an encoder which converts logic inputs into a serially coded waveform that is suitable for use in modulating AM or FM radio frequency (RF) transmitters. For example, IC 75 is commercially available from Princeton Technology of Taipei, Taiwan under part number PT2262. Resistor 76 determines an internal oscillator frequency, which may be selected to be about 4 KHz for this application. Thus, when comparator 72 pulls down the transmit enable terminal of IC 75 in response to a sufficiently large shock sensor signal, IC 75 provides a digital data stream of about 4,000 bits per second (4 kbps) on its output terminal 78. The code contained in the data stream is determined by the 12 address pins A0 through A11 of IC 75. For example, one or more jumpers 79 may bias selected address pins by applying bias voltages across resistors, such as resistor 77. Of course, DIP switches could alternatively be used for this purpose. Alternately, one or more resistors, such as resistor 71, may reference selected address pins to ground.

The output of IC 75 on line 78 is received by the base terminal of a transistor 82 through a resistor 81. Capacitor 80 decouples high frequencies from line 78. Transistor 82 forms part of an AM modulated transmitter that operates at the frequency of a surface acoustic wave (SAW) resonator 83. In this example, SAW resonator 83 was selected to be a frequency of 303.875 MHz. A SAW resonator was selected because of its frequency stability and minimal variation with time, voltage and temperature.

Transistor 82 is turned on and off by the data in the output signal of IC 75. When biased on, transistor 82 oscillates at the frequency of resonator 83. This oscillation is amplified in the collector circuit of transistor 82, which includes an antenna loop 87. Antenna loop 87 may be a rectangular trace of wire of approximately one-quarter wavelength (about 4.3 inches or 10.9 cm in circumference) around the periphery of the printed circuit board. Antenna loop 87 transmits RF energy into free space. Emitter resistor 85 sets the emitter current level and resistor 84 sets the collector current for proper operation. Capacitor 88 provides high frequency decoupling of the supply voltage at the antenna loop. Capacitors 90 and 91 provide reactance with the antenna loop at the resonant frequency. Capacitor 89 increases the high frequency gain of transistor 82.

The receiver 38, which will typically be located near the pump 40, receives any signals transmitted from electronic circuitry 50. Receiver 38 may have a similar code to that transmitted by transmitter 20 to differentiate from signals that may be transmitted by other transmitters with differently coded signals. Receiver 38 receives and decodes a signal from transmitter 20, receiver 38 then causes pump 40 to shutdown and terminate pumping. Alternately, if the vehicle 32 is equipped with an electrically controllable flow valve 35, receiver 38 may cause the valve 35 to be closed to terminate the flow of liquid material from the vehicle.

While the invention has been described in connection with liquid materials, the present invention is also useful in connection with the transfer of gaseous materials such as oxygen, nitrogen, and the like. Thus, the use of the terms “fluid” or “liquid” herein is meant to encompass both liquid materials and gaseous materials.

Figure 4:
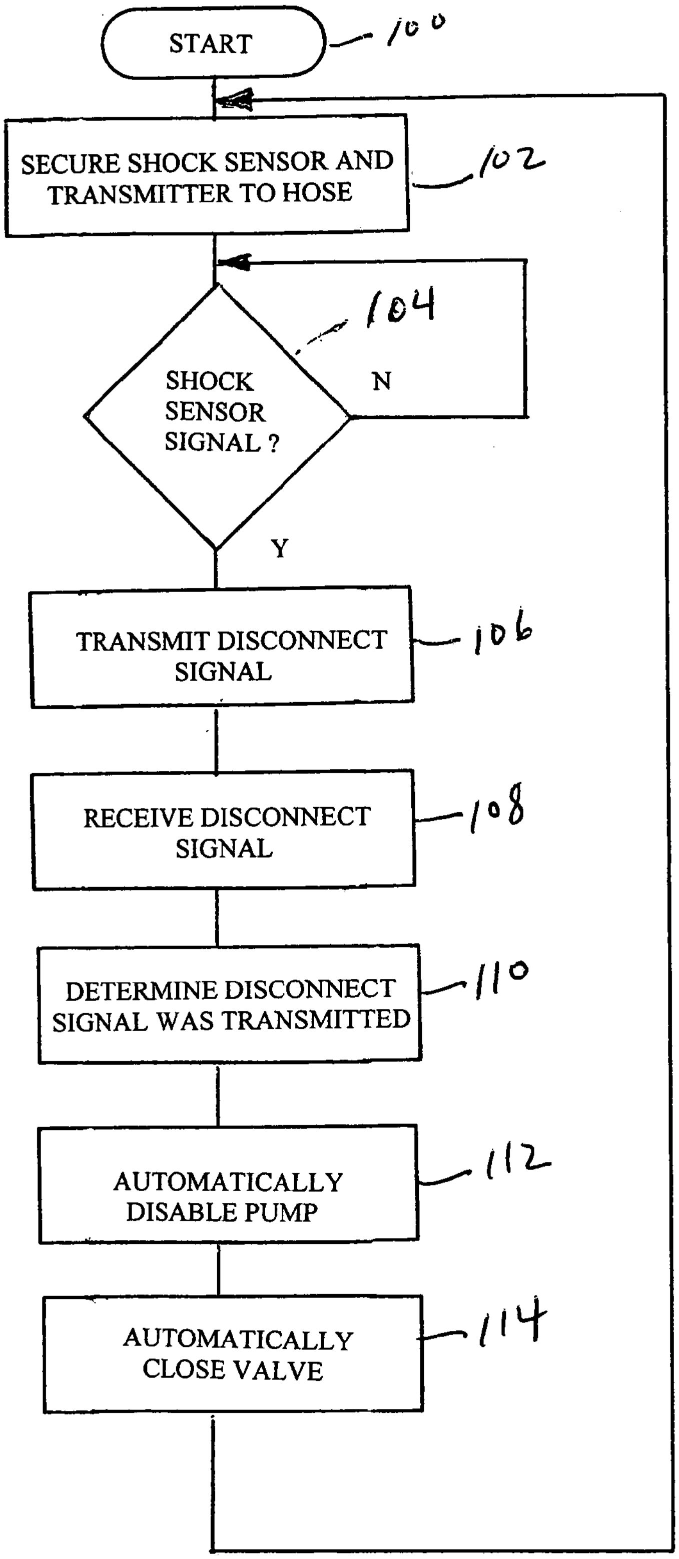
FIG. 4 is a block diagram of representative steps of methods practiced in accordance with the present invention.

The various steps used in practicing the present invention are shown in the flow diagram of FIG. 4. After starting at block 101, the shock sensor and transmitter are secured to the delivery hose at block 102. The shock sensor is then monitored by the electronic circuitry in the transmitter to determine if the shock sensor has an output signal indicative of a disconnect or separation condition at decision block 104. If no signal is detected at block 104, the transmitter continues to monitor the shock sensor.

When a shock signal is detected, the transmitter transmits a disconnect signal at block 106. As previously discussed, this disconnect signal may be encoded. The receiver then receives the transmitted disconnect signal at block 108, and determines at block 110 that the received disconnect signal was encoded for it at block 110. If so, the receiver automatically disables the pump at block 112 or automatically closes the valve at block 114, or both.

While particular embodiments of the invention have been shown and described, it will be obvious to those skilled in the art that changes and modifications may be made therein without departing from the invention in its broader aspects.

What is claimed is:

1. A system for determining whether a delivery hose has disconnected or separated from a source of fluid and for automatically terminating the flow of fluid in response to determining that the delivery hose has disconnected or separated, said system comprising:

a transmitter;

a shock sensor for providing a shock signal when a disconnected or separated hose strikes the ground or comes into contact with any object, said transmitter responsive to the shock signal from the shock sensor to transmit a disconnect signal;

means for securing the transmitter and shock sensor to said delivery hose;

a receiver for receiving the disconnect signal from the transmitter and for determining that a disconnect signal has been transmitted by the transmitter; and means for terminating the flow of fluid from the source of fluid in response to the receiver determining that a disconnect signal has been transmitted by the transmitter.

2. The system for determining whether a delivery hose has disconnected or separated in accordance with claim 1 wherein said source of fluid includes a fluid pump and wherein said means for terminating the flow of fluid includes means for terminating flow of fluid through the pump.

3. The system for determining whether a delivery hose has disconnected or separated in accordance with claim 1 wherein said source of fluid includes a valve in communication with the flow of fluid through said delivery hose, said means for terminating the flow of fluid includes means for automatically closing said valve.

4. The system for determining whether a delivery hose has disconnected or separated in accordance with claim 1 wherein said shock sensor is a strip of piezoelectric material.

5. The system for determining whether a delivery hose has disconnected or separated in accordance with claim 1 wherein said means for securing the transmitter and shock sensor to the hose is a hook and loop material.

6. The system for determining whether a delivery hose has disconnected or separated in accordance with claim 1 wherein said transmitter transmits an encoded radio frequency disconnect signal.

7. The system for determining whether a delivery hose has disconnected or separated in accordance with claim 1 wherein said transmitter includes electronic circuitry that has immunity to normal ambient vibration levels.

8. A transmitter for determining whether a delivery hose has disconnected or separated from a source of fluid and for transmitting a disconnect signal in response to determining that the delivery hose has disconnected or separated, said transmitter comprising:

a shock sensor for providing a shock signal when a disconnected hose strikes the ground or comes into contact with any object;

electronic circuitry responsive to the shock signal from the shock sensor to transmit a disconnect signal; and means for securing the transmitter to said delivery hose.

9. The transmitter for determining whether a delivery hose has disconnected or separated in accordance with claim 8 wherein said shock sensor is a strip of piezoelectric material.

10. The transmitter for determining whether a delivery hose has disconnected or separated in accordance with claim 8 wherein said means for securing the transmitter to the hose is a hook and loop material.

11. The transmitter for determining whether a delivery hose has disconnected or separated in accordance with claim 8 wherein said transmitter transmits an encoded radio frequency disconnect signal.

12. The transmitter for determining whether a delivery hose has disconnected or separated in accordance with claim 8 wherein said electronic circuitry has immunity to normal ambient vibration levels.

13. A method for determining that a delivery hose has disconnected or separated from a source of fluid said method comprising the steps of:

securing a shock sensor and transmitter to said delivery hose;

generating a shock signal in the shock sensor when the delivery hose falls to the ground or comes into contact with any object; and transmitting a disconnect signal from a transmitter to a receiver when the shock sensor generates the shock signal.

14. The method for determining that a delivery hose has disconnected or separated from the source of fluid in accordance with claim 13, said method comprising the additional steps of:

receiving the disconnect signal from the transmitter at a receiver; and determining at the receiver that a disconnect signal has been transmitted by the transmitter.

15. The method for determining that a delivery hose has disconnected or separated from a liquid delivery vehicle in accordance with claim 14, said method comprising the additional step of:

automatically terminating the flow of fluid from the source of fluid in response to the receiver determining that a disconnect signal has been transmitted by the transmitter.

16. The method for determining that a delivery hose has disconnected or separated from the source of fluid in accordance with claim 15, wherein the source of fluid includes a fluid pump, said method comprising the additional step of:

terminating the flow of fluid by automatically disabling the fluid pump.

17. The method for determining that a delivery hose has disconnected or separated from a source of fluid in accordance with claim 15, wherein the source of fluid includes a controllable valve, said method comprising the additional step of:

terminating the flow of fluid by automatically closing the controllable valve.

18. The method for determining that a delivery hose has disconnected or separated from a source of fluid in accordance with claim 13, wherein the step of generating a shock signal in the shock sensor includes sensing the shock with a strip of piezoelectric material.

19. The method for determining that a delivery hose has disconnected or separated from a liquid delivery vehicle in accordance with claim 13, wherein the step of securing the shock sensor and transmitter to the delivery hose includes securing the shock sensor and transmitter to the delivery hose with a hook and loop material.

20. The method for determining that a delivery hose has disconnected or separated from a source of fluid in accordance with claim 13, wherein the step of transmitting a disconnect signal includes the step of transmitting an encoded radio frequency disconnect signal.

* * * * *